(12) United States Patent
Song et al.

(10) Patent No.: US 9,481,087 B2
(45) Date of Patent: Nov. 1, 2016

(54) ROBOT AND CONTROL METHOD THEREOF

(71) Applicant: National Chiao Tung University, Hsinchu (TW)

(72) Inventors: Kai-Tai Song, New Taipei (TW); Ming-Han Lin, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 14/700,148

(22) Filed: Apr. 30, 2015

(65) Prior Publication Data

US 2016/0184990 A1    Jun. 30, 2016

(30) Foreign Application Priority Data

Dec. 26, 2014   (TW) .............................. 103145723 A (51) Int. Cl.
G05D 3/00   (2006.01)
G05B 15/00   (2006.01)
B25J 9/16   (2006.01)

(52) U.S. Cl.
CPC ............. *B25J 9/1664* (2013.01); *B25J 9/1674* (2013.01); *B25J 9/1679* (2013.01); *Y10S 901/01* (2013.01)

(58) Field of Classification Search
USPC .............................................. 701/2; 700/261
See application file for complete search history.

(56) References Cited

U.S. PATENT DOCUMENTS

| | | | | |
|---|---|---|---|---|
| 4,530,056 A | * | 7/1985 | MacKinnon ......... | G05D 1/0238 180/168 |
| 4,625,285 A | * | 11/1986 | Mori ..................... | G05B 19/414 318/568.17 |
| 4,925,312 A | * | 5/1990 | Onaga ................... | B25J 9/1633 318/568.22 |

(Continued)

FOREIGN PATENT DOCUMENTS

| CN | 101576384 | 1/2011 |
|---|---|---|
| CN | 101833791 | 4/2012 |

(Continued)

OTHER PUBLICATIONS

Marcharet et al., "A collaborative control system for telepresence robots," 2012 IEEE/RSJ International Conference on Intelligent Robots and Systems (IROS), Oct. 7-12, 2012, pp. 5105-5111.

(Continued)

*Primary Examiner* — Tyler Paige
(74) *Attorney, Agent, or Firm* — Jianq Chyun IP Office (57) ABSTRACT

A robot and a control method thereof are provided. The method includes the following steps: receiving a manual control command from a remote control device, and accumulating a duration of issuing the manual control commands; estimating an estimated moving velocity corresponding to the manual control command; detecting a surrounding environment of the robot and generating an autonomous navigation command based on the surrounding environment; determining a first weighting value associated with the manual control command based on the duration, the estimated moving velocity and the distance to obstacles; determining a second weighting value associated with the autonomous navigation command based on the first weighting value; linearly combining the manual control command and the autonomous navigation command based on the first weighting value and the second weighting value to generate a moving control command; and moving based on the moving control command.

18 Claims, 5 Drawing Sheets

(56) References Cited

U.S. PATENT DOCUMENTS

| | | | |
|---|---|---|---|
| 5,341,540 A * | 8/1994 | Soupert | A47L 11/4011 15/319 |
| 6,535,793 B2 | 3/2003 | Allard | |
| 6,741,054 B2 * | 5/2004 | Koselka | A47L 11/24 15/3 |
| 7,120,614 B2 * | 10/2006 | Ikeda | G06N 3/02 382/228 |
| 7,164,969 B2 | 1/2007 | Wang et al. | |
| 7,227,985 B2 * | 6/2007 | Ikeda | G06K 9/6218 382/159 |
| 7,853,372 B2 | 12/2010 | Park et al. | |
| 8,020,104 B2 * | 9/2011 | Robarts | G06F 1/163 706/45 |
| 8,387,193 B2 * | 3/2013 | Ziegler | A47L 5/14 15/319 |
| 8,467,904 B2 * | 6/2013 | Dariush | B25J 9/1602 345/474 |
| 8,996,177 B2 * | 3/2015 | Coenen | B25J 9/163 700/245 |
| 9,015,092 B2 * | 4/2015 | Sinyavskiy | G06N 3/08 706/25 |
| 2001/0047231 A1 * | 11/2001 | Peless | A01D 34/008 701/23 |
| 2007/0255454 A1 * | 11/2007 | Dariush | G06N 3/008 700/245 |
| 2008/0027591 A1 * | 1/2008 | Lenser | G05D 1/0251 701/2 |
| 2012/0072023 A1 * | 3/2012 | Ota | B25J 9/1664 700/259 |
| 2014/0009561 A1 * | 1/2014 | Sutherland | B25J 5/007 348/14.05 |
| 2014/0132082 A1 * | 5/2014 | McGinn | G05D 1/0061 307/125 |

FOREIGN PATENT DOCUMENTS

| | | |
|---|---|---|
| CN | 103192987 | 7/2013 |
| TW | M471913 | 2/2014 |
| TW | 201432619 | 8/2014 |

OTHER PUBLICATIONS

Carlson et al., "Increasing robotic wheelchair safety with collaborative control: Evidence from secondary task experiments," 2010 IEEE International Conference on Robotics and Automation (ICRA), May 3-8, 2010, pp. 5582-5587.

Ming-Han Lin, "Shared-Controller Design for an Omnidirectional Interactive Robot," Master's thesis, Jul. 2014, Institute of Electrical and Control Engineering, National Chiao Tung University.

"Office Action of Taiwan Counterpart Application", issued on May 5, 2016, p. 1-5.

\* cited by examiner

ROBOT AND CONTROL METHOD THEREOF

CROSS-REFERENCE TO RELATED APPLICATION

This application claims the priority benefit of Taiwan application serial no. 103145723, filed on Dec. 26, 2014. The entirety of the above-mentioned patent application is hereby incorporated by reference herein and made a part of this specification.

BACKGROUND OF THE INVENTION

1. Field of the Invention

The invention relates to a robot, and particularly relates to a robot and a control method thereof.

2. Description of Related Art

Owing to the recent development in sensors and control theories, the research and development of robots is expanding from automation in factories to services of various kinds, which creates a novel field of robot service. Currently, industrial analyses mostly indicate that using service-type robots to take over house chores for human beings is a promising field and may bring tremendous business opportunities. Thus, home service robots are becoming popularized, which brings a better quality of life of human beings and offers services and assistances in a more convenient way.

However, in the conventional technology, even though the robots are able to carry out tasks by using fixed algorithms, there are still unexpected variations that the current computer processing and smart algorithms are not matured enough to handle. Thus, regardless of the acting time and the abilities of judging and responding to the environment, the performance of the robots is not ideal, making the effect of the robots' service less preferable than expected. In addition, when these robots are carrying out tasks autonomously, the user is usually unable to intervene to control how the robots move.

Besides, when the robots are used as substitutes of the user to interact with others, the operator usually hopes to adaptively adjust the way the robots work or use the robots to represent him/her to perform an action through remote control. However, as the human environment is more complicated, remotely controlling the robot in such environment per se is already difficult, not to mention that any carelessness of the user may lead the robot to an accident such as hitting an obstacle.

In brief, whether to use the robots to carry out a task autonomously or under the user's control, further improvement to the conventional technology is required to make the applications of robots more free.

SUMMARY OF THE INVENTION

Accordingly, the invention provides a robot and a control method thereof allowing the robot to improve a way that the robot is operated by combining an intention of the user and autonomous control of the robot.

The invention provides a control method adapted for a robot. The method includes following steps. A manual control command is received from a remote control device and a duration of issuing the manual control commands is accumulated. In addition, the manual control command is adapted to move the robot. A surrounding environment of the robot is detected, and a distance from the robot to obstacles is estimated. A first weighting value associated with the manual control command is determined based on the duration, the estimated moving velocity, and a distance to obstacles. A second weighting value associated with an autonomous navigation command is determined. The sum of the first weighting value and the second weighting value is equal to 1. The manual control command and the autonomous navigation command are linearly combined based on the first weighting value and the second weighting value, so as to generate a moving control command.

According to an embodiment of the invention, the step of detecting the surrounding environment of the robot includes scanning the surrounding environment with a laser scanner to generate a scanning result, establish a map of the surrounding environment based on the scanning result, and positioning a current location of the robot in the map. The map is transmitted to the remote control device to be displayed to a remote operator.

According to an embodiment of the invention, the method includes spotting an object in response to a target selection command from the remote control device and receiving an execution command from the remote control device and controlling a robotic arm of the robot to perform a specific action to the object in response to the execution command.

According to an embodiment of the invention, the surrounding environment includes a target object and a plurality of obstacles, and the step of generating the autonomous navigation command based on the surrounding environment includes: generating a first moving velocity vector based on a maximal moving velocity and a buffering distance of the robot and a distance vector between the current location of the robot and the target object, generating a second moving velocity vector based on a position vector between each of the obstacles and the current location of the robot and a maximal safe distance of the robot, and adding up the first moving velocity vector and the second moving velocity vector to generate the autonomous navigation command.

According to an embodiment of the invention, the first moving velocity vector may be represented as follows:

$$\vec{V}_r = \begin{cases} \dfrac{\vec{D}}{D_{buffer}} V_{max}, & |\vec{D}| \le D_{buffer} \\ \dfrac{\vec{D}}{|\vec{D}|} V_{max}, & |\vec{D}| > D_{buffer} \end{cases},$$

wherein $\vec{D}$ is the distance vector between the robot and the target object, $V_{max}$ is the maximal moving velocity of the robot, and $D_{buffer}$ is the buffering distance of the target object.

According to an embodiment of the invention, the second moving velocity vector may be represented as follows:

$$\vec{V}_o = \alpha \sum_i \left[ \left( \dfrac{D_{max} - |\vec{x}_i|}{D_{max}} \right) \left( \dfrac{-\vec{x}_i}{|\vec{x}_i|} \right) \right],$$

wherein $\alpha$ is a constant, $\vec{x}_i$ is an $i^{th}$ position vector between the obstacle and the robot, and $D_{max}$ is the maximal safe distance of the robot.

According to an embodiment of the invention, the surrounding environment further includes a target object, and the method further includes calculating an angular velocity that the robot rotates a facing direction of a head of the robot based on a maximal angular velocity that the robot rotates the facing direction of the head of the robot, a buffering angle, and an included between a direction of the robot's face and the target object, and rotating the facing direction of the head of the robot based on the angular velocity, wherein the angular velocity is represented as:

$$\omega_r = \begin{cases} \frac{\Delta\theta}{\theta_{buffer}}\omega_{max}, & |\Delta\theta| \le \theta_{buffer} \\ \frac{\Delta\theta}{|\Delta\theta|}\omega_{max}, & |\Delta\theta| > \theta_{buffer} \end{cases}$$

wherein $\Delta\theta$ is the included angle between the direction of the robot's face and the target object, $\omega_{max}$ is the maximal angular velocity that the robot rotates the facing direction of the head of the robot, and $\theta_{buffer}$ is the buffering angle that the robot rotates the facing direction of the head of the robot.

According to an embodiment of the invention, the step of determining the first weighting value associated with the manual control command based on the duration, the estimated moving velocity, and the distance to the obstacles includes: when the duration exceeds a preset time, the estimated moving velocity is lower than a preset velocity, or the obstacle is further away, increasing the first weighting value, and when the duration does not exceed the preset time, the estimated moving velocity is not lower than the preset velocity, or the obstacle is closer, decreasing the first weighting value.

The invention provides a robot device, including a detection unit, a storage unit, and a processing unit. The detection unit detects a surrounding environment of the robot. The storage unit stores a plurality of modules. The processing unit is coupled to the detection unit and the storage unit, and accesses and executes the modules stored in the storage unit. The modules includes an accumulating module, an estimating module, a generating module, a determining module, a combining module, and a moving module. The accumulating module receives a manual control command from a remote control device and accumulating a duration of issuing the manual control commands. In addition, the manual control command is adapted to move the robot. The estimating module estimates a moving velocity of the robot. The generating module controls the detection unit to detect the surrounding environment of the robot and generates an autonomous navigation command based on the surrounding environment. The determines module determines a first weighting value associated with the manual control command based on the duration and the estimated manual moving velocity, and determines a second weighting value associated with the autonomous navigation command based on the first weighting value. The combining module linearly combines the manual control command and the autonomous navigation command based on the first weighting value and the second weighting value, so as to generate a moving control command. The moving module moves the robot based on the moving control command.

According to an embodiment of the invention, the modules further include a control module configured to spot an object in response to a target selection command from the remote control device and receive an execution command from the remote control device and control a robotic arm of the robot to perform a specific action to the object in response to the execution command.

According to an embodiment of the invention, the detection unit is a laser scanner, and the generating module is configured to scan the surrounding environment with the laser scanner to generate a scanning result, establish a map of the surrounding environment based on the scanning result, and position a current location of the robot in the map.

According to an embodiment of the invention, the surrounding environment includes a target object and a plurality of obstacles, and the generating module is configured to: generate a first moving velocity vector based on a maximal moving velocity and a buffering distance of the robot and a distance vector between the current location of the robot and the target object, generate a second moving velocity vector based on a position vector between each of the obstacles and the current location of the robot and a maximal safe distance of the robot, and add up the first moving velocity vector and the second moving velocity vector to generate the autonomous navigation command.

According to an embodiment of the invention, the first moving velocity vector may be represented as follows:

$$\vec{V}_r = \begin{cases} \frac{\vec{D}}{D_{buffer}}V_{max}, & |\vec{D}| \le D_{buffer} \\ \frac{\vec{D}}{|\vec{D}|}V_{max}, & |\vec{D}| > D_{buffer} \end{cases},$$

wherein $\vec{D}$ is the distance vector between the robot and the target object, $V_{max}$ is the maximal moving velocity of the robot, and $D_{buffer}$ is the buffering distance of the target object.

According to an embodiment of the invention, the second moving velocity vector may be represented as follows:

$$\vec{V}_o = \alpha \sum_i \left[\left(\frac{D_{max} - |\vec{x}_i|}{D_{max}}\right)\left(\frac{-\vec{x}_i}{|\vec{x}_i|}\right)\right].$$

wherein $\alpha$ is a constant, $\vec{x}_i$ is an $i^{th}$ position vector between the obstacle and the robot, and $D_{max}$ is the maximal safe distance of the robot.

According to an embodiment of the invention, the surrounding environment includes a target object, and the modules further include a rotating module configured to: calculate an angular velocity that the robot rotates a facing direction of a head of the robot based on a maximal angular velocity that the robot rotates the facing direction of the robot's head, a buffering angle and an included angle between a direction of the robot's face and the target object and rotate the robot based on the angular velocity. wherein the angular velocity is represented as:

$$\omega_r = \begin{cases} \frac{\Delta\theta}{\theta_{buffer}}\omega_{max}, & |\Delta\theta| \le \theta_{buffer} \\ \frac{\Delta\theta}{|\Delta\theta|}\omega_{max}, & |\Delta\theta| > \theta_{buffer} \end{cases},$$

wherein $\Delta\theta$ is the included angle between the direction of the robot's face and the target object, $\omega_{max}$ is the maximal angular velocity that the robot rotates the facing direction of the head of the robot, and $\theta_{buffer}$ is the buffering angle that the robot rotates the facing direction of the head of the robot.

According an embodiment of the invention, the determining module is configured to when the duration exceeds a preset time, the estimated moving velocity is lower than a preset velocity, or the obstacle is further away, increase the first weighting value, and when the duration does not exceed the preset time, the estimated moving velocity is not lower than the preset velocity, or the obstacle is closer, decrease the first weighting value.

Based on the above, the invention provides the robot and the control method thereby. By defining two variable weighting values, the user and the robot are able to change the degrees of dominance of the manual control command and the autonomous navigation command in the moving control command by changing an allocation of the weighting values. In this way, the robot is able to combine the user's intention and the autonomous control of the robot to improve the movement of the robot, thereby improving a working efficiency of the robot.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
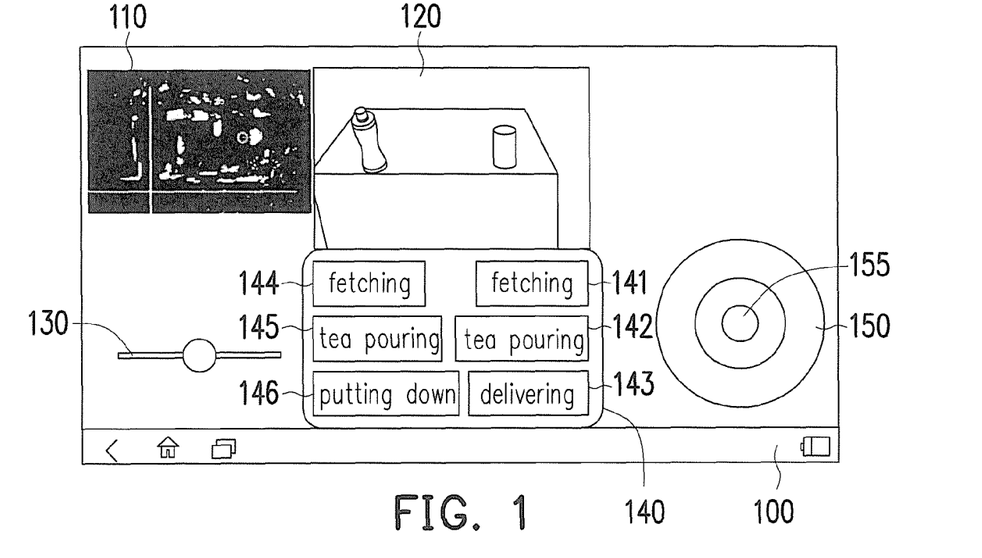
FIG. 1 is a schematic view illustrating a remote control device according to an embodiment of the invention.

FIG. 1 is a schematic view illustrating a remote control device according to an embodiment of the invention. In this embodiment, a remote control device 100 may be a smartphone, a tablet computer, a personal digital assistant (PDA), a notebook PC, or other similar devices. An interactive interface may be disposed in the remote control device 100, and the remote control device 100 allows a user to operate a component disposed therein to remotely control a robot or displays information such as an image or sound from the robot. The interactive interface is a touch panel, a touch screen, or other components capable of displaying information or allowing the user to input information, for example.

In an embodiment, the interactive interface may include a map reconstructed image 110, a robot vision image 120, a head facing direction rod 130, an action selection interface 140, and a virtual joystick region 150. The map reconstructed image 110 is map information obtained by the robot scanning a surrounding environment of the robot with a laser scanner, for example. The robot vision image 120 is an image captured by an image capturing device of the robot or other electronic devices having an image capturing function, for example. The head facing direction rod 130 allows the user to control a facing direction of a head of the robot with a leftward direction or a rightward direction. The action selection interface 140 controls a physical action of the robot. Action options 141 to 146 in the action selection interface 140 include physical actions, such as fetching, putting down, tea pouring, delivering, that are performed with a left or right robotic arm. However, the invention is not limited thereto.

The virtual joystick region 150 serves to control a moving direction and a moving velocity of the robot. The virtual joystick region 150 is a circular region, and a ball 155 at the center simulates a conventional gaming joystick. Thus, the user may operate the virtual joystick region 150 in a way similar to controlling with a conventional gaming joystick. For example, moving the ball upward/downward/leftward/rightward indicates that the user intends to control the robot to move forward/backward/leftward/rightward. Besides, an extent to which the user moves the ball 155 may be positively proportional to a moving velocity of the robot that the user is desirous of. For example, when a distance that the user moves the ball 155 is a radius of the circular region (i.e., the ball 155 is moved to the outermost circle of the circular region), it is indicated that the user hopes that a robot 200 moves at a maximal velocity. However, when the distance that the user moves the ball 155 is 50% of the radius of the circular region, it is indicated that the user hopes that the robot 200 moves at 50% of the maximal velocity. However, the invention is not limited thereto.

In other embodiments, the remote control device 100 may also include a front lens (not shown) to capture an image of the user. In addition, the remote control device 100 may transmit the image to the robot through a mobile communication network (e.g., a fourth generation mobile communication system) or a wireless network (e.g., a wireless fidelity (Wi-Fi) network).

Figure 2:
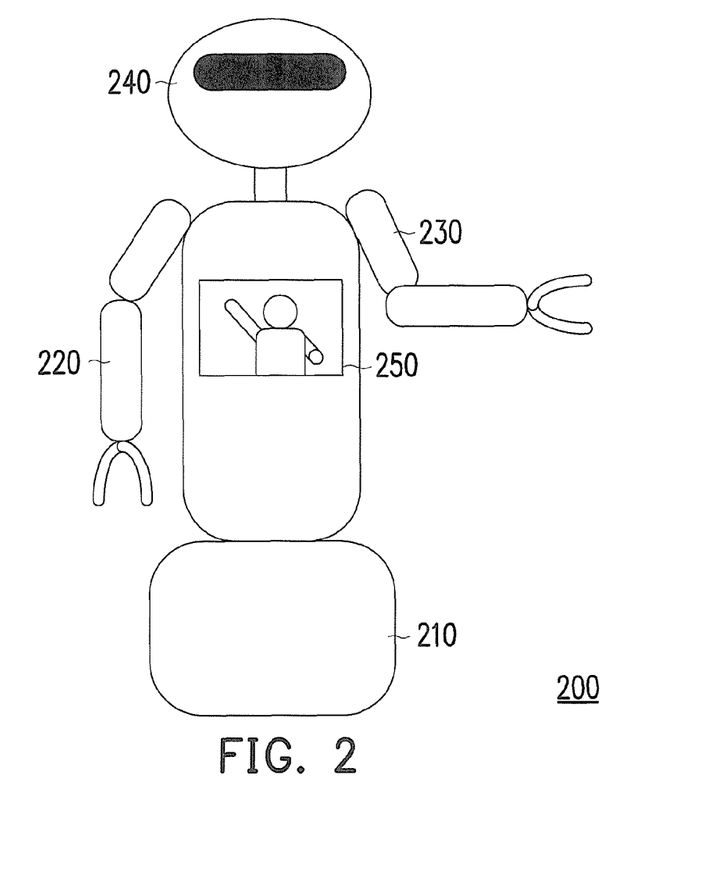
FIG. 2 is a schematic view illustrating an appearance of a robot according to an embodiment of the invention.

FIG. 2 is a schematic view illustrating an appearance of a robot according to an embodiment of the invention. In this embodiment, the robot 200 may carry out a task under the control of the remote control device 100 shown in FIG. 1. The remote control device 100 and the robot 200 may connect to and communicate with each other through socket data transmission of a wireless network. When operating the robot 200, the user may send an operational intention to the robot 200 through the interactive interface of the remote control device 100, and may receive information about the surrounding information (e.g., the map reconstructed image 110 and the robot vision image 120, etc.) through the interactive interface of the remote control device 100.

The robot 200 is provided with an omnidirectional moving platform 210, a right robotic arm 220, a left robotic arm 230, a head 240, and a display 250, so as to move and/or carry out a physical action in response to the user's operation made via the interactive platform. Components such as a motor controller (not shown), a motor driver (not shown), and a roller (not shown), etc., that are coupled to each other may be disposed in the moving platform 210. The moving platform 210 may control a movement of the robot 200 according to the user's operation made with the ball 155 and an autonomous navigation mechanism of the robot 200.

The right robotic arm 220 and the left robotic arm 230 may carry out actions such as fetching, putting down, tea pouring, and delivering, etc., according to the action option chosen by the user in the action selection interface 140. The head 240 may be equipped with a camera having a charged coupled device (CCD) lens, a complementary metal oxide semiconductor transistor (CMOS) lens, and or an infrared lens. The camera of any kind disposed at the head 240 may serve to capture the robot vision image 120, and the image is transmitted back to the remote control device 100 through a communication component in the robot 200. In addition, a Kinect sensor, a depth sensor, or a stereo camera may be disposed at the head 240. The display 250 is a liquid crystal display (LCD), a plasma display, a vacuum fluorescent display, a light-emitting diode (LED) display, a field emission display (FED), and/or other suitable displays, for example. The display 250 may display the user's image captured by the front lens of the remote control device 100.

Figure 3:
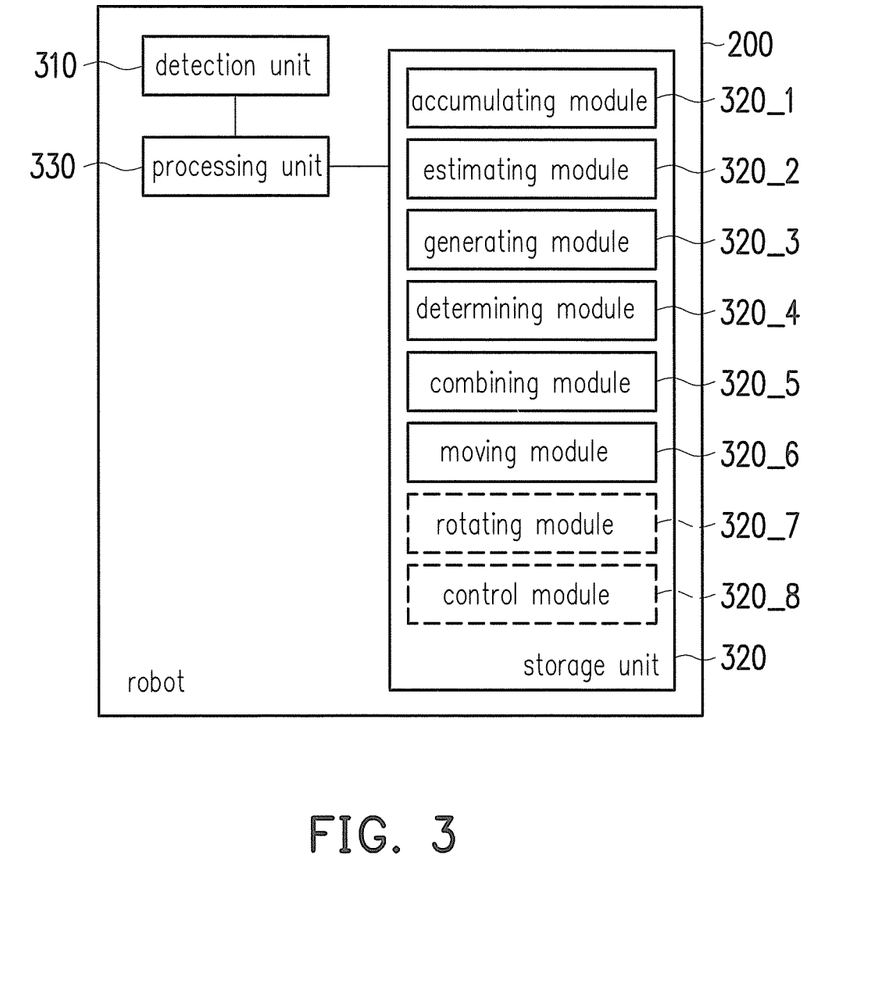
FIG. 3 is a functional block view of the robot according to the embodiment shown in FIG. 2.

FIG. 3 is a functional block view of the robot according to the embodiment shown in FIG. 2. In this embodiment, the robot 200 includes a detection unit 310, a storage unit 320, and a processing unit 330. The detection unit 310 is a laser scanner, for example, capable of using a laser beam to scan and detect objects around the robot 200, so as to obtain a distance sensing value between the robot 200 and at least one adjacent object. The storage unit 320 is a memory, a hard drive, or any other component suitable for data storage. In addition, the storage unit 320 may record a plurality of modules.

The processing unit 330 is coupled to the detection unit 310 and the storage unit 320. The processing unit 330 may be a processor for general purposes, a processor for special purposes, a conventional processor, a data signal processor, a plurality of microprocessors, one or more microprocessors, controllers, microcontrollers and application specific integrated circuits (ASIC) combined with a core of the digital signal processor, a field programmable gate array (FPGA), any other integrated circuits, a state machine, a processor based on advanced RISC Machine (ARM) and similar products.

In this embodiment, the processing unit 330 may access an accumulating module 320_1, an estimating module 320_2, a generating module 320_3, a determining module 320_4, a combining module 320_5, and a moving module 320_6 stored in the storage unit 320 to perform steps of a control method provided in the invention.

Figure 4:
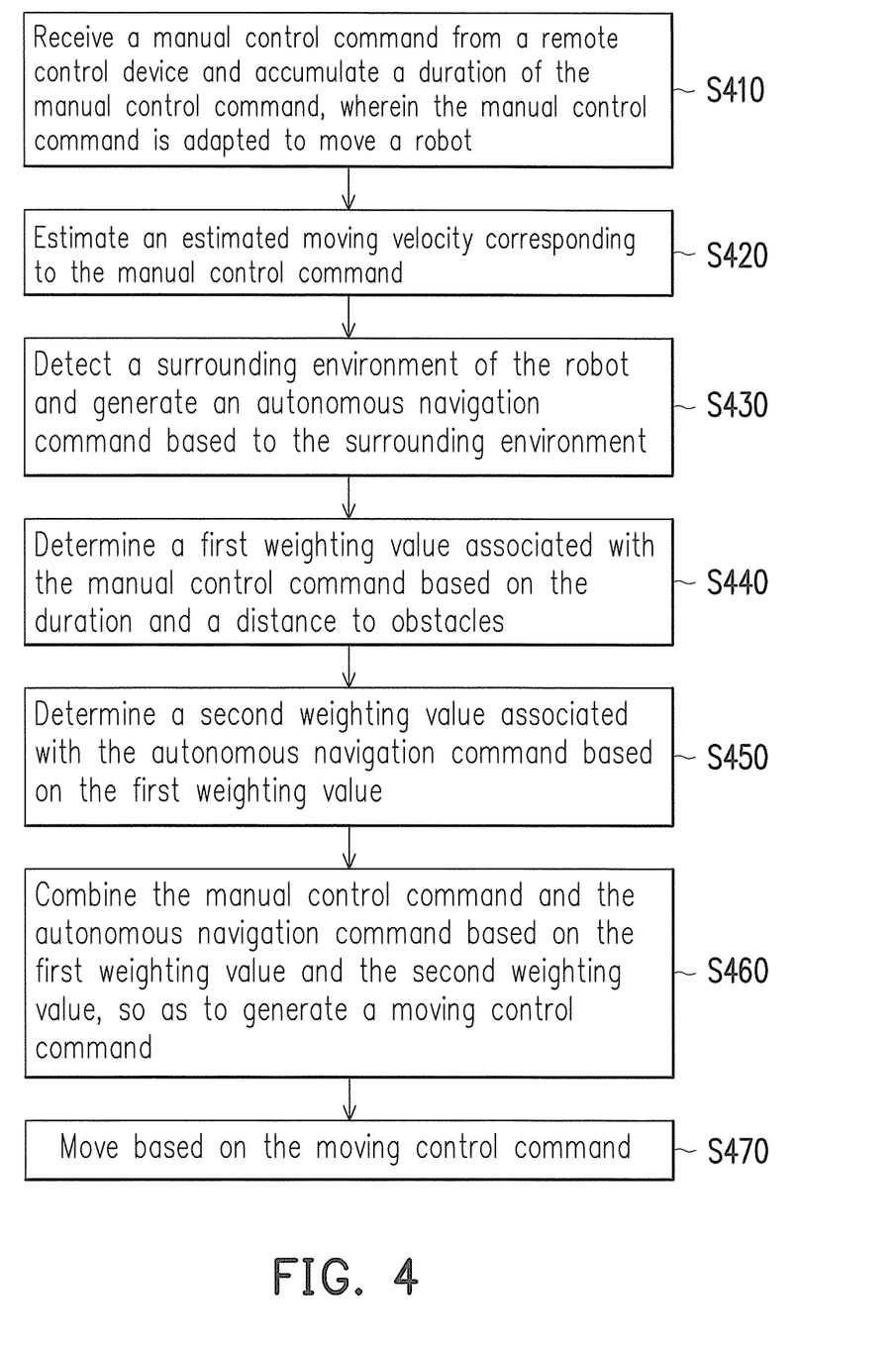
FIG. 4 is a flowchart illustrating a control method according to an embodiment of the invention.

FIG. 4 is a flowchart illustrating a robot and a control method thereof according to an embodiment of the invention. The method provided in this embodiment may be executed by the robot 200 shown in FIG. 3. With reference to the components shown in FIG. 3, details of steps of the method are described in the following.

At Step S410, the accumulating module 320_1 receives a manual control command from the remote control device 100 and accumulates a duration of issuing the manual control command. In this embodiment, the manual control command may serve to move the robot 200 and/or control the physical action of the robot 200. At Step S420, the estimating module 320_2 estimates an estimated moving velocity corresponding to the manual control command.

As mentioned in the previous embodiment, the user may control the moving direction and the moving velocity of the robot 200 through the virtual joystick region 150 of the remote control device 100. When the user controls the moving direction and the moving velocity of the robot 200 through the joystick region 150 of the remote control device 100, the remote control device 100 may transmit a manual control command including these control operations to the robot 200. After the robot 200 receives the manual control command from the remote control device 100, the accumulating module 220_1 firstly accumulates the duration of the manual control command (i.e., a duration from the user touches the virtual joystick region 150 until the user stops touching). Then, the estimating module 220_2 estimates the estimated moving velocity corresponding to the manual control command. In an embodiment, the estimating module 220_2 may infer the estimated moving velocity according to the distance that the user moves the ball 155. Specifically, if the distance that the user moves the ball 155 is 30% of the radius of the circular region in the virtual joystick region 150, the estimating module 220_2 may calculate that the estimated moving velocity is 30% of the maximal moving velocity of the robot 200. However, the invention is not limited thereto.

It should be understood that the estimated moving velocity merely corresponds to a velocity that the user hopes the robot 200 to move. The robot 200 may not move exactly based on the estimated moving velocity. Specifically, since the user may not be familiar with the surrounding environment of the robot 200, the robot 200 may hit an obstacle around if the robot 200 faithfully follows the user's operation to move. Thus, in the following, an autonomous navigation and obstacle avoiding mechanism of the robot 200 is further introduced to the embodiment of the invention, so as to modify the movement of the robot 200. In this way, when the user remotely controls the robot 200 to move, the robot 200 may appropriately assist the user to avoid obstacles in the surrounding environment of the robot 200, so as to provide a preferable operating experience.

In the following, at Step S430, the generating module 320_3 controls the detection unit 310 to detect the surrounding environment of the robot and generates an autonomous navigation command according to the surrounding environment. In this embodiment, the detection unit 310 is a laser scanner, for example. After using the laser scanner to scan the surrounding environment, the generating module 320_3 may generate a scanning result to establish a map of the surrounding environment and position a current location of the robot 200 in the map. In an embodiment, the generating module 320_3 may combine concepts of a polar scan matching (PSM) method and an extended Kalman filter (EKF) algorithm to process the scanning result of the laser scanner, thereby establishing the map and positioning the current location of the robot 200.

Figure 5A:
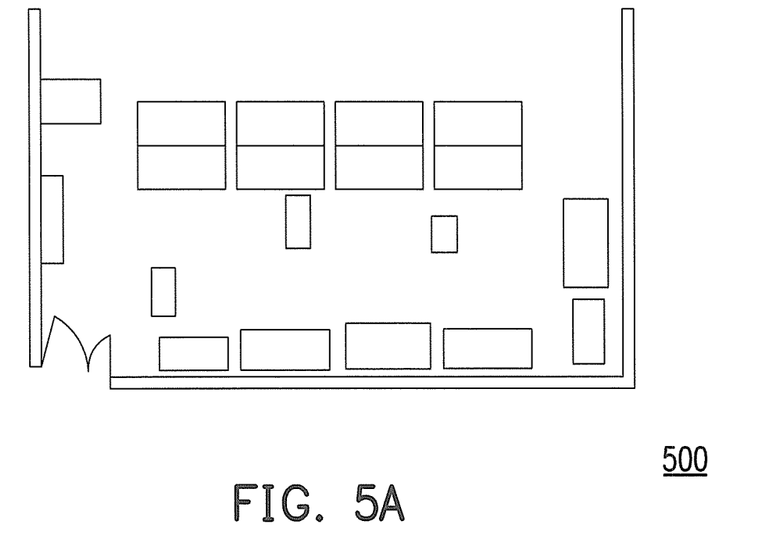
FIG. 5A is a surrounding environment according to an embodiment of the invention.

Referring to FIG. 5A, FIG. 5A is a surrounding environment according to an embodiment of the invention. In this embodiment, it is assumed that a surrounding environment 500 is the surrounding environment of the robot 200, and the surrounding environment 500 includes a plurality of obstacles (indicated with rectangular boxes). Under such circumstance, the generating module 320_3 may establish a map 510 shown in FIG. 5B based on the scanning result of the laser scanner, and position a current location 520 of the robot 200 in the map 510.

Figure 5B:
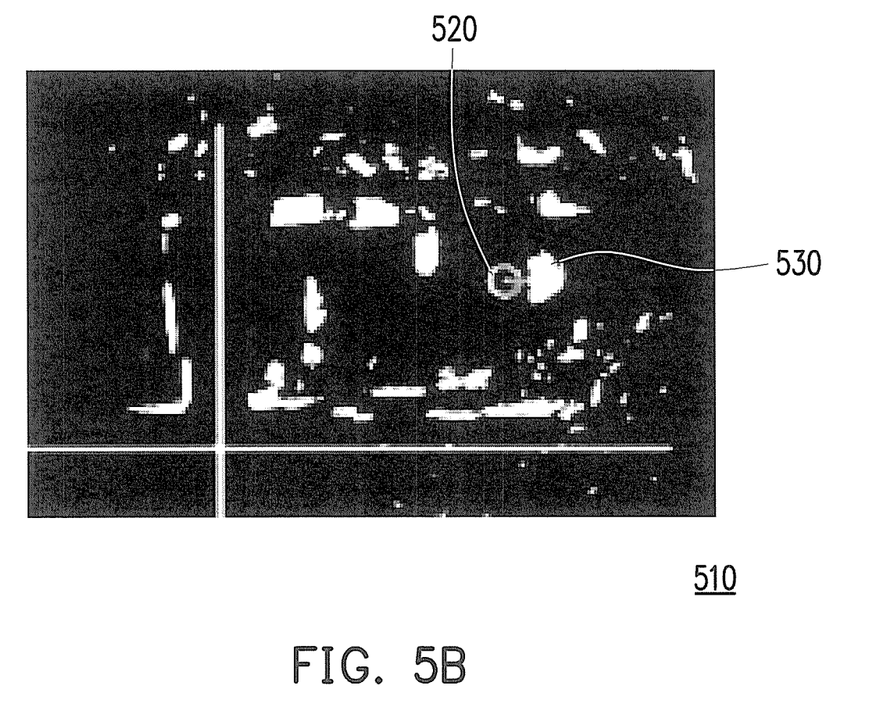
FIG. 5B is a map established based on a scanning result according to the embodiment shown in FIG. 5A.

FIG. 5B is a map established based on a scanning result according to the embodiment shown in FIG. 5A. Specifically, the generating module 320_3 may represent the scanning result of the laser scanner with polar coordinates based on the PSM method, and perform point-to-point matching between two scanning results. Then, the generating module 320_3 may correct the current location of the robot 200 in the map according to differences in location and angle between the two scanning results. Due to noises, errors may be generated in each result of matching, making a result of positioning unable to be used effectively in long-distance traveling. Thus, in this embodiment, the generating module 320_3 may make use of the EKF algorithm, an odometer, and a result of PSM calculation to reduce the errors generated when positioning the robot 200. It should be noted that positioning of the robot 200 and establishment of the map may be implemented with other algorithms, and the invention is not limited to the above.

In addition, in this embodiment, the map established by the generating module 320_3 and the current location of the robot 200 in the map may be transmitted back to the remote control device 100 and displayed as the map reconstructed image 110, such that the user may be aware of the surrounding environment of the robot 200 when remotely controlling the robot 200. Taking FIG. 5B as an example, the user may be informed through FIG. 5B that the robot 200 is close to an obstacle 530, so as to increase the user's awareness in operating the robot 200, thereby reducing a chance that the robot 200 hits the obstacle 530.

In other embodiments, when there is a target object in the surrounding environment of the robot 200, the generating module 320_3 may generate an autonomous navigation command that guides the robot 200 to the target object according to the surrounding environment.

In this embodiment, the autonomous navigation command (represented as $\vec{V}_r$) may be represented as a sum of following two vectors: (1) a first moving velocity vector for making the robot 200 move straight toward the target object, and (2) a second moving velocity vector for making the robot 200 avoid each obstacle.

In an embodiment, the generating module 320_3 may generate the first moving velocity vector (represented as $\vec{V}_r$) according to the maximal moving velocity and a buffering distance of the robot 200 and a distance vector between the current location of the robot 200 and the target object. The buffering distance is a safe distance for stopping the robot 200 from the maximal moving velocity, for example, or other distances designed by the designer.

In an embodiment, the first moving velocity vector ($\vec{V}_r$) may be represented as follows:

$$\vec{V}_r = \begin{cases} \dfrac{\vec{D}}{D_{buffer}} V_{max}, & |\vec{D}| \le D_{buffer} \\ \dfrac{\vec{D}}{|\vec{D}|} V_{max}, & |\vec{D}| > D_{buffer} \end{cases},$$

wherein $\vec{D}$ represents the distance vector between the current location of the robot 200 and the target object, $V_{max}$ represents the maximal moving velocity of the robot 200, and $D_{buffer}$ represents the buffering distance. Based on the formula above, it can be seen that when the distance between the robot 200 and the target object is greater than the buffering distance, the robot 200 moves toward the object at the maximal moving velocity. When the distance between the robot 200 and the target object is not greater than the buffering distance, the robot 200 may gradually decelerate until the robot 200 arrives at the target object.

In another embodiment, the generating module 320_3 may generate the second moving velocity vector (represented as $\vec{V}_o$) according to a position vector between each obstacle and the current location of the robot 200 and the maximal safe distance of the robot 200. The maximal safe distance is, for example, a safe distance that allows the robot 200 to avoid the obstacle, or a distance designed by the designer.

In an embodiment, the second moving velocity ($\vec{V}_o$) may be represented as:

$$\vec{V}_o = \alpha \sum_i \left[ \left( \dfrac{D_{max} - |\vec{x}_i|}{D_{max}} \right) \left( \dfrac{-\vec{x}_i}{|\vec{x}_i|} \right) \right],$$

wherein $\alpha$ represents a constant, $\vec{x}_i$ represents an $i^{th}$ position vector between the obstacle and the robot 200, and $D_{max}$ represents the maximal safe distance.

In this embodiment, $\vec{x}_i$ may be detected by using the laser scanner. For the $i^{th}$ obstacle, the generating module 320_3 may generate a vector for avoiding the obstacle (i.e., $$\left( \text{i.e., } \left( \dfrac{D_{max} - |\vec{x}_i|}{D_{max}} \right) \left( \dfrac{-\vec{x}_i}{|\vec{x}_i|} \right) \right).$$

Then, the generating module 320_3 may add up the vectors for avoiding all the obstacles to generate the second moving velocity vector ($\vec{V}_o$).

As mentioned earlier, the generating module 320_3 may add up the first moving velocity vector and the second moving velocity vector to generate the autonomous navigation command (i.e., $\vec{V}_t = \vec{V}_o + \vec{V}_r$) of the robot 200.

Figure 6A:
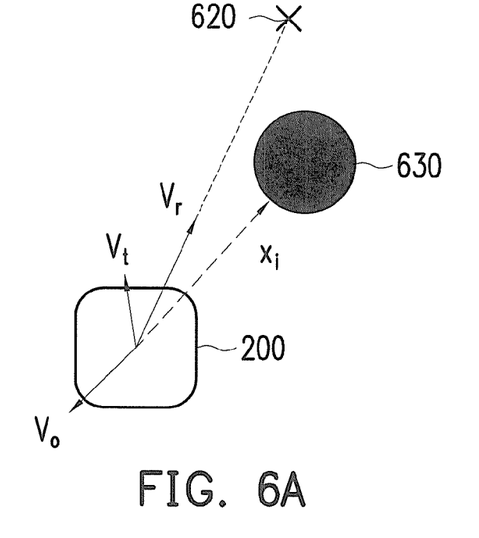
FIG. 6A is a schematic view illustrating generating an autonomous navigation command according to an embodiment of the invention.

Referring to FIG. 6A, FIG. 6A is a schematic view illustrating generating an autonomous navigation command according to an embodiment of the invention. In this embodiment, the generating module 320_3 may generate the first moving velocity vector ($\vec{V}_r$) for the robot 200 to move straight toward the target object 620 and the second moving velocity vector ($\vec{V}_o$) that makes the robot 200 avoid the obstacle 630. Then, the generating module 320_3 may add up the first moving velocity vector and the second moving velocity vector to generate the autonomous navigation command ($\vec{V}_t$). In brief, the autonomous navigation command ($\vec{V}_t$) allows the robot 200 to move toward the target object 620 without hitting the obstacle 630.

It should be noted that after the generating module 320_3 obtains the autonomous navigation command, the robot 200 does not immediately follow the autonomous navigation command to move. Specifically, as mentioned above, the autonomous navigation and obstacle avoiding mechanism of the robot 200 serves to assist the user in operating the robot 200. Thus, the autonomous navigation command needs to be combined with the manual control command from the remote control device 100 through a mechanism to generate a moving control command for controlling how the robot 200 moves exactly. The mechanism for combining the manual control command and the autonomous navigation command will be described in the following.

In other embodiments, the storage unit 320 may further include a rotating module 320_7 for rotating a facing direction of the head 240 when the robot 200 moves, such that a face direction of the robot 200 turns to the target object to capture an image of the target object. In an embodiment, the rotating module 320_7 may calculate an angular velocity that the robot 200 rotates according to a maximal angular velocity that the robot 200 moves the head 240, a buffering angle, and an included angle between the face direction of the robot 200 and the target object. Then, the rotating module 320_7 may rotate the facing direction of the head of the robot 200. The buffering angle is a safe angle sufficient for stopping the robot 200 the maximal angular velocity, for example, or other angles designed by the designer.

In an embodiment, the angular velocity that the robot 200 rotates the facing direction of the head may be represented in the following:

$$\omega_r = \begin{cases} \frac{\Delta\theta}{\theta_{buffer}}\omega_{max}, & |\Delta\theta| \le \theta_{buffer} \\ \frac{\Delta\theta}{|\Delta\theta|}\omega_{max}, & |\Delta\theta| > \theta_{buffer} \end{cases},$$

wherein $\omega_{max}$ represents the maximal angular velocity that the robot 200 rotates, and $\theta_{buffer}$ represents the buffering angle. Based on the equation, it can be seen that when the angle between the face direction of the robot 200 and the target object is greater than the buffering angle, the rotating module 320_7 may rotate the head 240 based on the maximal angular velocity. When the angle between the face direction of the robot 200 and the target object is not greater than the buffering angle, the rotating module 320_7 may gradually decrease the velocity that the head 240 rotates until the face direction of the robot 200 is toward the target object.

Figure 6B:
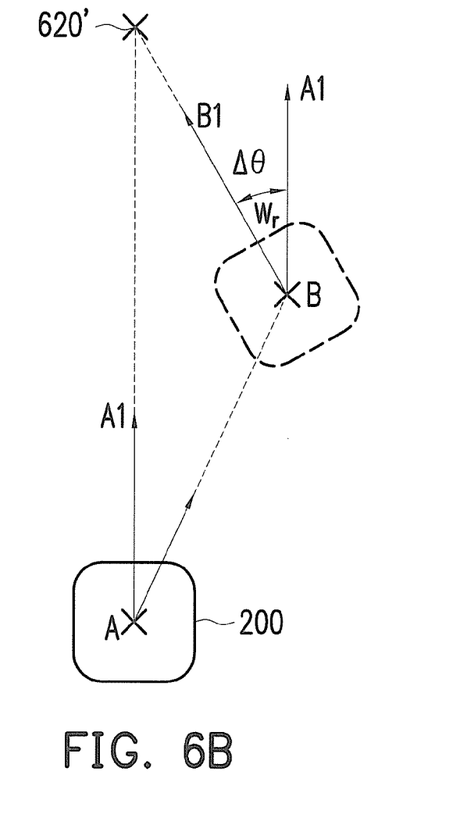
FIG. 6B is a schematic view illustrating a robot rotating its head according to an embodiment of the invention.

Referring to FIG. 6B, FIG. 6B is a schematic view illustrating a robot rotating its head according to an embodiment of the invention. In this embodiment, when the robot 200 is at a location A, the face direction of the robot 200 is a direction A1 toward a target object 620', for example. After the robot 200 moves to a location B, the rotating module 320_7 may rotate the face direction of the robot 200 from the direction A1 to a direction B1 toward the object 620' according to the above teachings.

In an embodiment, the mechanism of combining the manual control command and the autonomous navigation command include, for example, determining the corresponding first and second weighting values and then linearly combining the manual control command and the autonomous navigation command according to the first and second weighting values to generate the moving control command. Each of the first weighting value and the second weighting value may be considered as a control gain, and the control gains may reflect a degree of dominance of the manual control command and the autonomous navigation command in the moving control command. In the following, details of the first weighting value and the second weighting value are described.

Referring to FIG. 4 again, at Step S440, the determining module 320_4 determines the first weighting value associated with the manual control command according to the duration, the estimated moving velocity, and the distance to the obstacles.

In an embodiment, when the duration exceeds a preset duration or the estimated moving velocity is lower than a preset velocity, the determining module 320_4 may increase the first weighting value. Besides, when the duration does not exceed the preset duration or the estimated moving velocity is not lower than the preset velocity, the determining module 320_4 may decrease the first weighting value.

Specifically, when the determining module 320_4 detects that the duration that the user touches the virtual joystick region 150 exceeds the preset duration (e.g., 20 seconds), it is indicated that the user is more dedicated to control the movement of the robot 200. Thus, the determining module 320_4 may increase the first weighting value, so as to increase the degree of dominance of the manual control command in the moving control command. Alternatively, when the determining module 320_4 detects that the duration that the user touches the virtual joystick region 150 does not exceed the preset duration, the determining module 320_4 may determine to decrease the first weighting value, so as to reduce the degree of dominance of the manual control command in the moving control command.

Besides, when the determining module 320_4 detects that the estimated moving velocity of the robot 200 is lower than a preset velocity (e.g., 50 cm/sec), it is indicated that even if the robot 200 moves at the estimated moving velocity, an accident such as hitting an obstacle is not likely to occur. In other words, the user is more likely to ensure the safety and stability of the robot 200. Thus, the determining module 320_4 may also increase the first weighting value, so as to increase the degree of dominance of the manual control command in the moving control command. Alternatively, when the determining module 320_4 detects that the estimated moving velocity of the robot is not lower than the preset velocity, it is indicated that an accident such as hitting an obstacle is likely to occur if the robot 200 moves at the estimated moving velocity. In other words, the user is less likely to ensure the safety and stability of the robot 200. Thus, the determining module 320_4 may decrease the degree of the first weighting value, so as to decrease the degree of dominance of the manual control command in the moving control command.

At Step S450, the determining module 320_4 determines the second weighting value associated with the autonomous navigation command according to the first weighting value. In an embodiment, a sum of the first weighting value and the second weighting value is equal to 1.

Then, at Step S460, the combining module 320_5 linearly combines the manual control command and the autonomous navigation command based on the first weighting value and the second weighting value, so as to generate the moving control command of the robot 200. In an embodiment, the combining module 320_5 may add up multiplication of the first weighting value and the manual control command and multiplication of the second weighting value and the autonomous navigation command to generate the moving control command. However, the embodiments of the invention are not limited thereto. Then, at Step S470, the moving module 320_6 may move the robot 200 based on the moving control command.

In brief, according to the method of the embodiments of the invention, the first weighting value associated with the manual control command and the second weighting value associated with the autonomous navigation command may be adjusted according to the duration of the manual control command and the surrounding environment of the robot 200. In this way, when the user controls the robot 200 to move by using the remote control device 100, the robot 200 may also assist the user with its capability of autonomous navigation and obstacle avoidance, etc., so as to avoid accidents such as hitting an obstacle.

In other embodiments, the storage unit 320 may further include a control module 320_8 for controlling the robot 200 to perform a physical action to an object in response to the operation of the user made to the remote control device 100.

Referring to FIG. 1 again, the robot vision image 120 may include two objects (e.g., a bottle and a cup), and by clicking on an object, the user may determine an object to which an action is intended to be performed by controlling the right robotic arm 220 and/or the left robotic arm 230. Assuming that the user clicks on an object (e.g., the bottle) in the robot vision image 120, the remote control device 100 may convert the operation into a target selection command and transmit the target selection command to the robot 200. Then, the control module may spot the target in response to the target selection command. In an embodiment, the control module 320_8 may obtain a depth image provided by a Kinect sensor, for example, and convert a position of the object in a three-dimensional space through projection, and plan a path for moving the right robotic arm 220 and/or the left robotic arm 230 toward the object.

After the user chooses the object, the user may further select one of the action options 141-146 in the action selection interface 140, so as to control the right robotic arm 220 and/or the left robotic arm 230 to perform a specific action to the object. In this embodiment, the three action options 141-143 at the right side of the action selection interface 140 serve to control the right robotic arm 220, for example, and the three actions 144-146 at the left side of the action selection interface may serve to control the left robotic arm 230, for example. Assuming that the user chooses the action option 144, it is indicated that the user intends to control the left robotic arm 230 to perform a specific action of fetching to the object with the left robotic arm 230. Under such circumstance, the remote control device 100 may correspondingly generate an execution command and send the execution command to the robot 200. Then, the control module 320_8 may control the left robotic arm 230 to grab the object (e.g., the bottle) in response to the execution command.

In other embodiments, when the user controls the right robotic arm 220 to fetch another object (e.g., the cup) with the remote control device 100, the control module 320_8 may also control the right robotic arm 220 to fetch the cup according to the above teachings Then, when the user clicks on the action option 145 to control the left robotic arm 230 to perform a specific tea pouring action, the remote control device 100 may also generate a corresponding execution command and transmitting the execution command to the robot 200. Then, the control module 320_8 may control the left robotic arm 230 to pour liquid in the bottle to the cup fetched by the right robotic arm 220 in response to the execution command.

After completing the specific action of tea pouring, the user may choose a target object (e.g., a human figure not shown herein) in the robot vision image 120. At this time, the remote control device 100 may also convert the operation into a target selection command and transmit the target selection command to the robot 200. Then, the control module 320_8 may spot the human figure according to the teachings above. Afterwards, when the user clicks on the option 143, the remote control device 100 may generate the corresponding execution command and send the execution command to the robot 200. In response to the execution command, the control module 320_8 may control the right robotic arm 320_8 to deliver the cup filled with the liquid fetched by the right robotic arm 220 to the human figure.

In brief, the user may control a time point that the robot 200 performs a specific action by using the method proposed in the invention, and control the action performed by the robotic arm and the object the action is performed to.

People having ordinary skills in the art shall understand that the devices and functions thereof, algorithms, tasks, and actions used in the previous embodiments merely serve as examples, instead of serving to limiting possible embodiments of the invention.

In view of the foregoing, based on the method according to the embodiments of the invention, the first weighting value associated with the manual control command and the second weighting value associated with the autonomous navigation command may be adjusted according to the duration of issuing the manual control commands and the surrounding environment of the robot. In this way, when the user controls the robot to move through the remote control device, the robot may also assist the user with its capability of autonomous navigation and obstacle avoidance, etc., so as to avoid accidents such as hitting an obstacle. In addition, the user may control a time point that the robot performs a specific action by using the method proposed in the invention, and control the robotic arm to perform an action to an object in a more precise way.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control method for a robot having a detection unit and a processing unit, comprising:
   receiving a manual control command by the processing unit from a remote control device and accumulating a duration of issuing the manual control command by the processing unit, wherein the manual control command is adapted to move the robot;
   estimating an estimated moving velocity corresponding to the manual control command by the processing unit;
   controlling the detection unit to detect a surrounding environment of the robot by the processing unit and generating an autonomous navigation command based on the surrounding environment by the processing unit;
   determining a first weighting value associated with the manual control command by the processing unit based on the duration, the estimated moving velocity, and a distance to obstacles;
   determining a second weighting value associated with the autonomous navigation command by the processing unit based on the first weighting value;
   linearly combining the manual control command and the autonomous navigation command by the processing unit based on the first weighting value and the second weighting value, so as to generate a moving control command; and
   moving the robot by the processing unit based on the moving control command.

2. The method as claimed in claim 1, further comprising:
   spotting an object by the processing unit in response to a target selection command from the remote control device; and
   receiving an execution command by the processing unit from the remote control device and controlling a robotic arm of the robot to perform a specific action to the object in response to the execution command.

3. The method as claimed in claim 1, wherein the step of detecting the surrounding environment of the robot by the processing unit comprises:

scanning the surrounding environment with a laser scanner by the processing unit to generate a scanning result; and establishing a map of the surrounding environment by the processing unit based on the scanning result and positioning a current location of the robot in the map by the processing unit.

4. The method as claimed in claim 3, wherein the surrounding environment comprises a target object and a plurality of obstacles, and the step of generating the autonomous navigation command by the processing unit based on the surrounding environment comprises:

generating a first moving velocity vector by the processing unit based on a maximal moving velocity and a buffering distance of the robot and a distance vector between the current location of the robot and the target object;

generating a second moving velocity vector by the processing unit based on a position vector between each of the obstacles and the current location of the robot and a maximal safe distance of the robot; and adding up the first moving velocity vector and the second moving velocity vector by the processing unit to generate the autonomous navigation command.

5. The method as claimed in claim 4, wherein the first moving velocity vector is represented as:

$$\vec{V}_r = \begin{cases} \dfrac{\vec{D}}{D_{buffer}} V_{max}, & |\vec{D}| \le D_{buffer} \\ \dfrac{\vec{D}}{|\vec{D}|} V_{max}, & |\vec{D}| > D_{buffer} \end{cases},$$

wherein $\vec{D}$ is the distance vector between the robot and the target object, $V_{max}$ is the maximal moving velocity of the robot, and $D_{buffer}$ is the buffering distance between the robot and the target object.

6. The method as claimed in claim 4, wherein the second moving velocity vector is represented as:

$$\vec{V}_o = \alpha \sum_i \left[ \left( \dfrac{D_{max} - |\vec{x}_i|}{D_{max}} \right) \left( \dfrac{-\vec{x}_i}{|\vec{x}_i|} \right) \right],$$

wherein $\alpha$ is a constant, $\vec{x}_i$ is an $i^{th}$ position vector between the obstacle and the robot, and $D_{max}$ is the maximal safe distance of the robot.

7. The method as claimed in claim 1, wherein the surrounding environment comprises a target object, and the method further comprises:

calculating an angular velocity that the robot rotates a facing direction of a head of the robot by the processing unit based on a maximal angular velocity that the robot rotates the facing direction of the robot's head, a buffering angle and an included angle between a direction of the robot's face and the target object; and rotating the facing direction of the robot's head by the processing unit based on the angular velocity, wherein the angular velocity is represented as:

$$\omega_r = \begin{cases} \dfrac{\Delta\theta}{\theta_{buffer}} \omega_{max}, & |\Delta\theta| \le \theta_{buffer} \\ \dfrac{\Delta\theta}{|\Delta\theta|} \omega_{max}, & |\Delta\theta| > \theta_{buffer} \end{cases}$$

wherein $\Delta\theta$ is the included angle between the direction of the robot's face and the target object, $\omega_{max}$ is the maximal angular velocity that the robot rotates the facing direction of the head of the robot, and $\theta_{buffer}$ is the buffering angle that the robot rotates the facing direction of the head of the robot.

8. The method as claimed in claim 1, wherein the step of determining the first weighting value associated with the manual control command by the processing unit based on the duration, the estimated moving velocity, and the distance to the obstacles comprises:

when the duration exceeds a preset duration or the estimated moving velocity is lower than a preset velocity, increasing the first weighting value by the processing unit;

when the duration does not exceed the preset duration or the estimated moving velocity is not lower than the preset velocity, decreasing the first weighting value by the processing unit;

when the duration exceeds the preset duration or the distance to the obstacles is greater than a preset distance, increasing the first weighting value by the processing unit; and when the duration does not exceed the preset duration or the distance to the obstacles is not greater than the preset distance, decreasing the first weighting value by the processing unit.

9. The method as claimed in claim 1, wherein a sum of the first weighting value and the second weighting value is equal to 1.

10. A robot, comprising:

a detection unit, detecting a surrounding environment of the robot;

a storage unit, storing a plurality of modules; and a processing unit, coupled to the detection unit and the storage unit, accessing and executing the modules stored in the storage unit, the modules comprising:

an accumulating module, receiving a manual control command from a remote control device and accumulating a duration of the manual control command, wherein the manual control command is adapted to move the robot;

an estimating module, estimating an estimated moving velocity corresponding to the manual control command;

a generating module, controlling the detection unit to detect the surrounding environment of the robot and generating an autonomous navigation command based on the surrounding environment;

a determining module, determining a first weighting value associated with the manual control command based on the duration, the estimated moving velocity, and a distance to obstacles, and determining a second weighting value associated with the autonomous navigation command based on the first weighting value;

a combining module, linearly combining the manual control command and the autonomous navigation command based on the first weighting value and the second weighting value, so as to generate a moving control command; and a moving module, moving the robot based on the moving control command.

11. The robot as claimed in claim 10, wherein the modules further comprise a control module, configured to:
spot an object in response to a target selection command from the remote control device; and
receive an execution command from the remote control device and control a robotic arm of the robot to perform a specific action to the object in response to the execution command.

12. The robot as claimed in claim 10, wherein the detection unit is a laser scanner, and the generating module is configured to:
scan the surrounding environment with the laser scanner to generate a scanning result; and
establish a map of the surrounding environment based on the scanning result and position a current location of the robot in the map.

13. The robot as claimed in claim 12, wherein the surrounding environment comprises a target object and a plurality of obstacles, and the generating module is configured to:
generate a first moving velocity vector based on a maximal moving velocity and a buffering distance of the robot and a distance vector between the current location of the robot and the target object;
generate a second moving velocity vector based on a position vector between each of the obstacles and the current location of the robot and a maximal safe distance of the robot; and
add up the first moving velocity vector and the second moving velocity vector to generate the autonomous navigation command.

14. The robot as claimed in claim 13, wherein the first moving velocity vector is represented as:

$$\vec{V}_r = \begin{cases} \dfrac{\vec{D}}{D_{buffer}} V_{max}, & |\vec{D}| \le D_{buffer} \\ \dfrac{\vec{D}}{|\vec{D}|} V_{max}, & |\vec{D}| > D_{buffer} \end{cases},$$

wherein $\vec{D}$ is the distance vector between the robot and the target object, $V_{max}$ is the maximal moving velocity of the robot, and $D_{buffer}$ is the buffering distance between the robot and the target object.

15. The robot as claimed in claim 13, wherein the second moving velocity vector is represented as:

$$\vec{V}_o = \alpha \sum_i \left[ \left( \dfrac{D_{max} - |\vec{x}_i|}{D_{max}} \right) \left( \dfrac{-\vec{x}_i}{|\vec{x}_i|} \right) \right],$$

wherein $\alpha$ is a constant, $\vec{x}_i$ is an i position vector between the obstacle and the robot, and $D_{max}$ is the maximal safe distance of the robot.

16. The robot as claimed in claim 10, wherein the surrounding environment comprises a target object, and the modules further comprise a rotating module configured to:
calculate an angular velocity that the robot rotates a facing direction of a head of the robot based on a maximal angular velocity that the robot rotates the facing direction of the robot's head, a buffering angle and an included angle between a direction of the robot's face and the target object; and
rotate the facing direction of the head of the robot based on the angular velocity,
wherein the angular velocity is represented as:

$$\omega_r = \begin{cases} \dfrac{\Delta\theta}{\theta_{buffer}} \omega_{max}, & |\Delta\theta| \le \theta_{buffer} \\ \dfrac{\Delta\theta}{|\Delta\theta|} \omega_{max}, & |\Delta\theta| > \theta_{buffer} \end{cases}$$

wherein $\Delta\theta$ is the included angle between the direction of the robot's face and the target object, $\omega_{max}$ is the maximal angular velocity that the robot rotates the facing direction of the head of the robot, and $\theta_{buffer}$ is the buffering angle that the robot rotates the facing direction of the head of the robot.

17. The robot as claimed in claim 10, wherein the determining module is configured to:
increase the first weighting value when the duration exceeds a preset duration or the estimated moving velocity is lower than a preset velocity;
decrease the first weighting value when the duration does not exceed the preset duration or the estimated moving velocity is not lower than the preset velocity;
increase the first weighting value when the duration exceeds the preset duration or the distance to the obstacles is greater than a preset distance; and
decrease the first weighting value when the duration does not exceed the preset duration or the distance to the obstacles is not greater than the preset distance.

18. The robot as claimed in claim 10, wherein a sum of the first weighting value and the second weighting value is equal to 1.

* * * * *